(12) United States Patent
Hashizume

(10) Patent No.: US 7,877,985 B2
(45) Date of Patent: Feb. 1, 2011

(54) EXHAUST GAS PURIFICATION SYSTEM FOR INTERNAL COMBUSTION ENGINE

(75) Inventor: Takeshi Hashizume, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 881 days.

(21) Appl. No.: 11/794,658

(22) PCT Filed: May 12, 2006

(86) PCT No.: PCT/JP2006/009979

§ 371 (c)(1), (2), (4) Date: Jul. 3, 2007

(87) PCT Pub. No.: WO2006/123761

PCT Pub. Date: Nov. 23, 2006

(65) Prior Publication Data

US 2008/0196395 A1 Aug. 21, 2008

(30) Foreign Application Priority Data

May 18, 2005 (JP) .............................. 2005-145495

(51) Int. Cl.
*F01N 3/00* (2006.01)
*F01N 1/00* (2006.01)
(52) U.S. Cl. .............................. 60/292; 60/287; 60/291; 60/295; 60/297; 60/324
(58) Field of Classification Search ................ 55/282.2, 55/282.3, 283, 286; 60/276, 277, 285, 286, 60/287, 291, 292, 295, 297, 303, 324
See application file for complete search history.

(56) References Cited

FOREIGN PATENT DOCUMENTS

| DE | 198 38 032 A1 | 3/1999 |
|---|---|---|
| EP | 1 512 860 A | 3/2005 |
| FR | 2 774 424 A | 8/1999 |
| JP | 4-8718 U | 1/1992 |
| JP | 07293226 A * | 11/1995 |
| JP | 2001-317333 | 11/2001 |
| JP | 2003-090209 A | 3/2003 |
| JP | 2003-120263 | 4/2003 |

OTHER PUBLICATIONS

Yasuura et al, Machine Translation of JP 07-293226 A, Nov. 7, 1995.*
Yasuura et al, English Abstract of JP 07-293226 A, Nov. 7, 1995.*

* cited by examiner

*Primary Examiner*—Thomas E Denion
*Assistant Examiner*—Audrey Klasterka
(74) *Attorney, Agent, or Firm*—Kenyon & Kenyon LLP

(57) ABSTRACT

The present invention is directed to an exhaust gas purification system for an internal combustion engine that performs high pressure PM filter regeneration process by decreasing the degree of opening of an exhaust throttle valve in regenerating the particulate matter trapping capacity of a particulate filter and has as an object to provide a technology that enables to perform the high pressure PM filter regeneration process while suppressing excessive temperature rise of the particulate filter even while the vehicle is moving. According to the invention, a prediction is made, when the high pressure PM filter regeneration process is performed, as to whether there is a possibility that the temperature of the particulate filter will reach a predetermined upper limit temperature, and the pressure inside the particulate filter is controlled in accordance with the prediction.

10 Claims, 12 Drawing Sheets

EXHAUST GAS PURIFICATION SYSTEM FOR INTERNAL COMBUSTION ENGINE

This is a 371 national phase application of PCT/JP2006/309979 filed 12 May 2006, claiming priority to Japanese Patent Application No. JP 2005-145495 filed 18 May 2005, the contents of which are incorporated herein by reference.

FIELD OF THE INVENTION

The present invention relates to a technology for regenerating the particulate matter (PM) trapping capacity of a particulate filter.

BACKGROUND OF THE INVENTION

Japanese Patent Application Laid-Open NO. 2001-317333 discloses a process of regenerating the PM trapping capacity of a particulate filter while increasing the pressure inside the particulate filter by decreasing the degree of opening of an exhaust throttle valve provided in an exhaust passage downstream of the particulate filter (which process will be hereinafter referred to as the high pressure PM filter regeneration process). Japanese Utility Model Application Laid-Open No. 4-008718 and Japanese Patent Application Laid-Open No. 2003-120263 also disclose technologies related to regeneration of the PM trapping capacity of a particulate filter.

SUMMARY OF THE INVENTION

If the high pressure PM filter regeneration process is performed while running conditions of the internal combustion engine are varying every second as is the case when the vehicle equipped with that engine is moving, it is highly likely that the temperature of the particulate filter rises excessively. For this reason, it has been difficult to perform the high pressure PM filter regeneration process while the vehicle is moving.

The present invention has been made in view of the above described circumstances and has as an object to provide a technique to perform the high pressure PM filter regeneration process while suppressing excessive temperature rise of a particulate filter in an exhaust gas purification system for an internal combustion engine that is adapted to perform the high pressure PM filter regeneration process, even during the time in which running conditions of the internal combustion engine can easily change as is the case when the vehicle is moving.

To achieve the above object, according to the present invention, in an exhaust gas purification system for an internal combustion engine that is adapted to the perform high pressure PM filter regeneration process by increasing the pressure inside the particulate filter to regenerate its PM trapping capacity, a prediction is made as to whether or not there is a possibility that the temperature of the particulate filter will reach a predetermined upper limit temperature when the high pressure regeneration process is performed. The pressure inside the particulate filter is controlled based on the result of this prediction thereby making it possible to perform the high pressure PM filter regeneration process while preventing excessive temperature rise of the particulate filter even during the time in which running conditions of the internal combustion engine can easily change as is the case when the vehicle is moving.

Specifically, an exhaust gas purification system for an internal combustion engine according to the present invention comprises a particulate filter that traps particulate matter contained in the exhaust gas, an exhaust throttle valve provided in an exhaust passage downstream of the particulate filter, a PM filter regeneration device for performing PM filter regeneration process to oxidate and remove particulate matter trapped on the particulate filter, a pressure increasing device for increasing the pressure inside the particulate filter by decreasing the degree of opening of the exhaust throttle valve when the PM filter regeneration process is performed, a prediction device for predicting whether or not there is a possibility that the temperature of the particulate filter will reach an upper limit value when the pressure inside the particulate filter is increased by the pressure increasing device, and a pressure decreasing device for decreasing the pressure inside the particulate filter if it is predicted by the prediction means that there is a possibility that the temperature of the particulate filter will reach the upper limit value.

The pressure increasing device is adapted to reduce the degree of opening of the exhaust throttle valve while the PM filter regeneration process is performed to increase the pressure (the partial pressure of oxygen) inside the particulate filter. If the PM filter regeneration process is performed in the state in which the pressure inside the particulate filter has been increased (the high pressure PM filter regeneration process), the time required for the PM filter regeneration process can be made shorter, since the reaction rate in oxidation of the particulate matter is enhanced.

Since the quantity of heat of oxidation reaction generated per unit time increases with an increase in the rate of the oxidation reaction of particulate matter, the temperature of the particulate filter tends to become higher during the high pressure PM filter regeneration process than during the normal PM filter regeneration process (that is, the PM filter regeneration process that is performed without decreasing the degree of opening of the exhaust throttle valve). Especially when running conditions of the internal combustion engine can easily change as is the case when the vehicle is moving, it is highly likely that changes in the amount and/or temperature of the exhaust gas causes an excessive rise in the temperature of the particulate filter. For this reason, it has been difficult to perform the high pressure PM filter regeneration process while the vehicle is moving.

In view of the above, in the exhaust gas purification system according to the present invention, while the high pressure PM filter regeneration process is being performed, a prediction is made by the prediction device as to whether or not there is a possibility that the temperature of the particulate filter will reach an predetermined upper limit temperature. This upper limit temperature may be the temperature at which the particulate filter starts to deteriorate due to heat. However, in order to prevent such thermal deterioration of the particulate filter for sure, it is preferred that the upper limit temperature be set lower than the temperature at which the particulate filter starts to deteriorate due to heat. Here, the deterioration of the particulate filter due to heat refers to not only thermal deterioration of the particulate filter itself but also thermal deterioration of the catalyst or other elements supported on or annexed to the particulate filter.

If it is predicted by the prediction device that there is a possibility that the temperature of the particulate filter will reach the aforementioned upper limit value, the pressure decreasing device functions to decrease the pressure inside the particulate filter. This causes a decrease in the rate of oxidation reaction of particulate matter in the particulate filter, and the quantity of heat generated by oxidative reaction of per unit time decreases accordingly. Therefore, the temperature of the particulate filter is hard to reach the upper limit temperature.

By decreasing the pressure inside the particulate filter when it is predicted that there is a possibility that the temperature of the particulate filter will reach the upper limit temperature in the above described manner, excessive temperature rise of the particulate filter can be prevented even if the high pressure PM filter regeneration process is performed during the time in which running conditions of the internal combustion engine can easily change as is the case when the vehicle is moving. Therefore, it is possible to enlarge the range of running conditions in which the high pressure PM filter regeneration process is allowed to be performed.

In making a prediction as to whether or not there is a possibility that the temperature of the particulate filter will reach the upper limit temperature in the present invention, it may be determined that there is a possibility that the temperature of the particulate filter will reach the upper limit temperature, for example, when at least one of the following conditions is met: 1) the quantity of the exhaust gas flowing into the particulate filter is small; 2) the temperature of the particulate filter itself is close to the upper limit temperature; 3) the amount of the particulate matter trapped on the particulate filter (or the amount of the particulate matter remaining on the particulate filter) is large.

In the present invention, the method of decreasing the pressure inside the particulate filter may be, for example, to increase the degree of opening of the exhaust throttle valve, to decrease the degree of opening of the intake throttle valve, to increase the quantity of the EGR gas recirculated from the exhaust passage in the upstream of the particulate filter to the intake passage, to enlarge the volume of a variable volume turbocharger, or to increase the quantity of the exhaust gas flowing into a bypass passage that detours around the particulate filter, etc.

In the present invention, the pressure decreasing device may be adapted to stop the high pressure PM filter regeneration process (namely to release the high pressure state inside the particulate filter realized by the pressure increasing device) immediately when it is predicted that there is a possibility that the temperature of the particulate filter will reach the upper limit temperature.

If the high pressure PM filter regeneration process is stopped at the time when it is predicted that there is a possibility that the temperature of the particulate filter will reach the upper limit temperature, the pressure inside the particulate filter falls steeply. Therefore, it is easy to prevent excessive temperature rise of the particulate filter.

After the high pressure PM filter regeneration process is stopped, the PM filter regeneration process may be terminated entirely, or, alternatively, normal PM filter regeneration process may be continued.

On the other hand, the pressure decreasing device in the present invention may be adapted in such a way that it does not stop the high pressure PM filter regeneration process immediately when it is predicted by the prediction device that there is a possibility that the temperature of the particulate filter will reach the upper limit temperature, but continues the high pressure PM filter regeneration process while decreasing the pressure inside the particulate filter.

In that case, in decreasing the pressure inside the particulate filter, the pressure decreasing device may use as a parameter(s) at least one of the quantity of the exhaust gas flowing into the particulate filter, the temperature of the particulate filter itself, the amount of the particulate matter trapped on the particulate filter and the load of the internal combustion engine.

When the quantity of the exhaust gas flowing into the particulate filter becomes smaller, the quantity of heat carried away from the particulate filter by the exhaust gas decreases. Accordingly, the temperature of the particulate filter is likely to rise.

However, if the pressure inside the particulate filter is decreased as the quantity of the exhaust gas flowing into the particulate filter becomes smaller, it is possible to continue the high pressure PM filter regeneration process while reducing the possibility that the temperature of the particulate filter rises to the upper limit temperature.

The higher the temperature of the particulate filter itself is, the higher the rate of oxidation reaction of the particulate matter trapped on the particulate filter is, and the more the temperature of the particulate filter is likely to rise accordingly. In addition, when the temperature of the particulate filter becomes high, the possibility that the temperature of the particulate filter is raised to the upper limit temperature by a small quantity of heat generated by oxidation reaction arises.

However, if the pressure inside the particulate filter is decreased as the temperature of the particulate filter itself becomes higher, it is possible to continue the high pressure PM filter regeneration process while reducing the possibility that the temperature of the particulate filter rises to the upper limit temperature.

The larger the amount of the particulate matter trapped on (or remaining on) the particulate filter is, the larger the quantity of particulate matter that is oxidized per unit time becomes. Accordingly, the quantity of heat generated by oxidation reaction per unit time becomes larger, and the temperature of the particulate filter is likely to rise.

However, if the pressure inside the particulate filter is decreased as the amount of the particulate matter trapped on the particulate filter increases, it is possible to continue the high pressure PM filter regeneration process while reducing the possibility that the temperature of the particulate filter rises to the upper limit temperature.

The higher the load of the internal combustion engine is, the higher the temperature of the exhaust gas flowing into the particulate filter becomes. An increase in the temperature of the exhaust gas flowing into the particulate filter leads to an increase in the quantity of heat transferred from the exhaust gas to the particulate filter, which in turn leads to a decrease in the quantity of heat transferred from the particulate filter to the exhaust gas. Accordingly, the temperature of the particulate filter is likely to rise.

However, if the pressure inside the particulate filter is made lower as the load of the internal combustion engine becomes higher, it is possible to continue the high pressure PM filter regeneration process while reducing the possibility that the temperature of the particulate filter rises to the upper limit temperature.

In the case where, at the time at which it is predicted by the prediction device that there is a possibility that the temperature of the particulate filter will reach the upper limit temperature, the quantity of the exhaust gas flowing into the particulate filter is excessively small, the temperature of the particulate filter itself reaches nearly the upper limit temperature, or the amount of the particulate matter trapped on the particulate filter is excessively large, it is highly likely that the temperature of the particulate filter reaches the upper limit temperature if the temperature of the particulate filter has risen close to the upper limit temperature. In such cases, the high pressure PM filter regeneration process may be stopped (namely, the high pressure state inside the particulate filter realized by the pressure increasing device may be released) immediately.

If the degree of opening of the exhaust throttle valve is small when the load of the internal combustion engine is relatively high, there is a possibility that the drivability is deteriorated as well as a possibility that the temperature of the particulate filter reaches the upper limit temperature. In view of this, the high pressure PM filter regeneration process may be stopped (namely, the high pressure state inside the particulate filter realized by the pressure increasing device may be released) when the load of the internal combustion engine exceeds a predetermined load.

The exhaust gas purification system according to the present invention may be further provided with an estimation device for estimating the amount of the particulate matter remaining on the particulate filter while the PM filter regeneration process is performed. In this case, the pressure decreasing device may be adapted to increase the pressure inside the particulate filter as the amount of the particulate matter estimated by the estimation device becomes smaller.

As the amount of the particulate matter remaining on the particulate filter decreases, the quantity of oxidation heat generated by oxidation of the particulate matter per unit time also decreases. If the pressure inside the particulate filter is increased as the amount of the particulate matter remaining on the particulate filter decreases, it is possible to continue the high pressure PM filter regeneration process while reducing the possibility that the temperature of the particulate filter rises to the upper limit temperature.

One method of estimating the amount of the particulate matter remaining on the particulate filter while the PM filter regeneration process is performed is to estimate the quantity of particulate matter that is oxidized per unit time (or the PM oxidization rate) based on, as parameters, the temperature of the particulate filter and the quantity of the exhaust gas flowing into the particulate filter and to determine the amount of the remaining particulate matter based on a value obtained by that estimation and the time over which the PM filter regeneration process has been performed.

However, the quantity of particulate matter oxidized per unit time changes depending on the pressure inside the particulate filter. In view of this, in the present invention, the estimation device is designed to estimate the amount of the particulate matter remaining on the particulate filter taking into consideration also the pressure inside the particulate filter in addition to the temperature of the particulate filter and the quantity of the exhaust gas flowing into the particulate filter.

By the above described method, it is possible to estimate the amount of the particulate matter remaining on the particulate filter accurately. Therefore, it is also possible to adjust the pressure inside the particulate filter to a pressure that is suitable for the actual amount of the remaining particulate matter when the high pressure PM filter regeneration process is performed, and to terminate the high pressure PM filter regeneration process at an appropriate time (for example, at the time when the amount of remaining particulate matter becomes substantially zero).

The exhaust gas purification system according to the present invention may be provided with fuel injection device that continues to inject a predetermined quantity of fuel without effecting fuel cut even if the running condition of the internal combustion engine enters the region in which fuel cut is to be effected while the high pressure PM filter regeneration process is being performed.

Since the degree of opening of the exhaust throttle valve is made small while the high pressure PM filter regeneration process is performed, performing fuel cut may lead to deterioration in the drivability. More specifically, when the degree of opening of the exhaust throttle valve is made small, the exhaust gas pressure acting on the internal combustion is high, and therefore frictions in the internal combustion engine are large. If fuel injection is stopped under such a situation, there is a possibility that unnecessary strong braking force (so-called exhaust brake) acts on the internal combustion engine to deteriorate the drivability.

If a predetermined quantity of fuel injection is continued without effecting fuel cut when the running condition of the internal combustion engine enters the region in which fuel cut is to be effected while the high pressure PM filter regeneration process is performed, a torque counteracting the exhaust brake is created. Thus, deterioration in drivability can be prevented. Furthermore, the predetermined quantity of fuel injection helps to keep the exhaust gas temperature high. Therefore, an additional advantageous effect that the high pressure PM filter regeneration process is continued even in the running condition in which fuel cut is to be effected.

In view of the fact that the braking force acting on the internal combustion engine increases with an increase in the higher the pressure inside the particulate filter, the higher the pressure inside the filter is, the larger the aforementioned predetermined quantity may be made.

By increasing or decreasing the fuel injection quantity in proportion to the pressure inside the particulate filter as described above, it is possible to generate a torque proportional to the braking force. Thus, it is possible to prevent deterioration in the drivability even when the braking force acting on the internal combustion engine changes.

There may be cases where activation of exhaust brake is requested while the high pressure PM filter regeneration process is being performed. If the degree of opening of the exhaust throttle valve is further decreased when such a request is made, there is a possibility that the pressure inside the particulate filter becomes excessively high to cause an excessive temperature rise of the particulate filter.

In view of this, in the exhaust gas purification system according to the present invention, a flow rate regulation valve may be provided in the exhaust passage upstream of the particulate filter, and in addition exhaust brake means for activating exhaust brake by decreasing either the degree of opening of the exhaust throttle valve or the flow rate regulation valve may also be provided.

When a request for activating exhaust brake is made while the high pressure PM filter regeneration process is being performed, the exhaust brake device selectively determines which of the exhaust throttle valve and the flow rate regulation valve is to be used to activate exhaust brake depending on the result of prediction by the prediction device.

For example, in the case where it is predicted by the prediction device that there is a possibility that the temperature of the particulate filter will reach the upper limit temperature, the exhaust brake device activates exhaust brake by decreasing the degree of opening of the flow rate regulation valve.

If this is done, the exhaust gas pressure in the upstream of the flow rate regulation valve increases, and the exhaust gas pressure in the downstream of it decreases. Accordingly, it is possible to increase the exhaust gas pressure acting on the internal combustion engine while reducing the pressure inside the particulate filter. Consequently, it is possible to activate exhaust brake while suppressing excessive temperature rise of the particulate filter.

On the other hand, in the case where it is predicted by the prediction device that there is no possibility that the temperature of the particulate filter will reach the upper limit temperature, the exhaust brake device activates exhaust brake by decreasing the degree of opening of the exhaust throttle valve.

If this is done, the exhaust gas pressure in the upstream of the exhaust throttle valve increases, and therefore, it is possible to increase the exhaust gas pressure acting on the internal combustion engine while increasing the pressure inside the particulate filter. Consequently, it is possible to activate exhaust brake and regenerate the particulate matter trapping capacity of the particulate filter earlier.

In connection with the above, when a request for activating exhaust brake is made while the high pressure PM filter regeneration process is being performed, the exhaust brake device may activate exhaust brake by decreasing the degree of opening of the flow rate regulation valve irrespective of the result of prediction by the prediction device.

The above and other objects, features and advantages of the present invention will become more readily apparent to those skilled in the art from the following detailed description of preferred embodiments of the present invention taken in conjunction with the accompanying drawings.

DETAILED DESCRIPTION

In the following, specific embodiments of the present invention will be described with reference to the accompanying drawings.

First Embodiment

Figure 1:
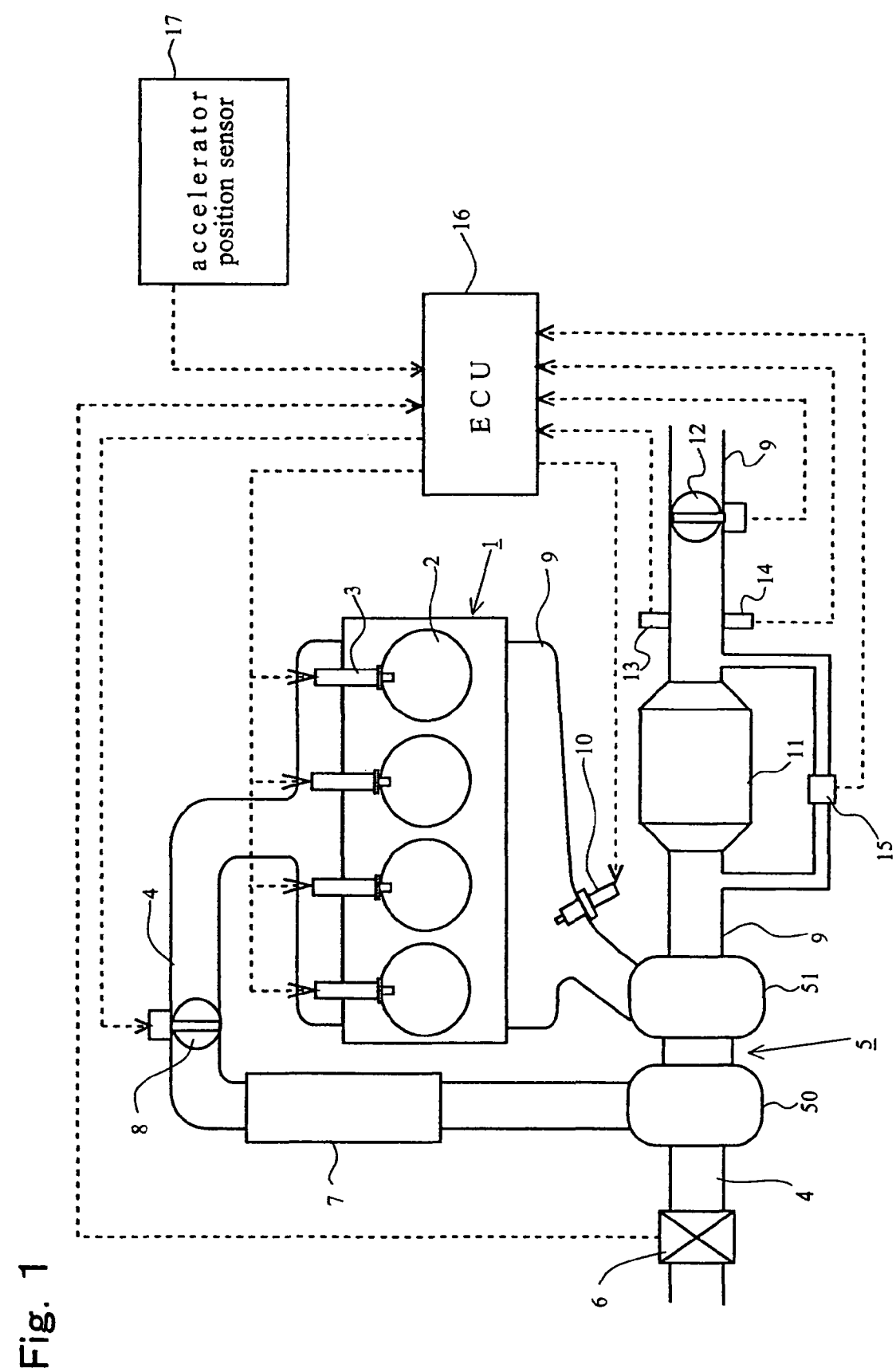
FIG. 1 is a diagram schematically showing the structure of the internal combustion engine.

A first embodiment of the present invention will be described with reference to FIGS. 1 through 12. FIG. 1 is a diagram schematically showing the structure of an internal combustion engine to which the present invention is applied.

The internal combustion engine 1 shown in FIG. 1 is a compression ignition type internal combustion engine that is driven using light oil as fuel (i.e. a diesel engine). The internal combustion engine 1 has a plurality of cylinders 2, each of which is provided with a fuel injection valve 3 that injects fuel directly into the cylinder 2.

The internal combustion engine 1 is connected with an intake passage 4. In the intake passage 4 is provided a compressor housing 50 of a centrifugal supercharger (or a turbocharger) 5. An air flow meter 6 is provided in the intake passage 4 upstream of the compressor housing 50. An intake air cooler (i.e. intercooler) 7 is provided in the intake passage downstream of the compressor housing 50. An intake throttle valve 8 is provided in the intake passage 4 downstream of the intercooler 7.

The internal combustion engine 1 is connected with an exhaust passage 9. At certain position in the exhaust passage 9 is provided a turbine housing 51 of the turbocharger 5. A fuel addition valve 10 for adding fuel to the exhaust gas flowing in the exhaust passage 9 is provided in the exhaust passage 9 upstream of the turbine housing 51. A particulate filter 11 is provided in the exhaust passage downstream of the turbine housing 51.

A catalyst having an oxidizing ability is supported on the base member of the particulate filter 11. The catalyst having an oxidizing ability may be for example an oxidizing catalyst, a three-way catalyst or an NOx storage reduction catalyst. Alternatively, a catalyst having an oxidizing ability may be provided just upstream of the particulate filter 11 instead of the oxidizing catalyst having an oxidizing ability supported on the base member of the particulate filter 11.

An exhaust throttle valve 12 is provided in the exhaust passage 9 downstream of the particulate filter 11. An exhaust gas temperature sensor 13 and an exhaust gas pressure sensor 14 are provide in the exhaust passage 9 downstream of the particulate filter 11 and upstream of the exhaust throttle valve 12. In addition, a pressure difference sensor 15 for detecting the difference in the exhaust gas pressure between upstream and downstream of the particulate filter 11 (which will be hereinafter referred to as the pressure difference across the filter) is also provided in the exhaust passage 9.

To the internal combustion engine 1 is annexed an ECU 16. The ECU 16 is an arithmetic and logic circuit composed of, a CPU, a ROM, RAM and a backup RAM and other elements. The ECU 16 is electrically connected with the aforementioned various sensors such as the air flow meter 6, the exhaust gas temperature sensor 13, the exhaust gas pressure sensor 14 and the pressure difference sensor 15. The ECU 16 is also electrically connected with the fuel injection valve 3, the intake throttle valve 8, the fuel addition valve 10 and the exhaust throttle valve 12.

In the internal combustion engine 1 having the above described structure, the ECU 16 is adapted to execute PM filter regeneration control that constitutes the principal feature of the present invention as well as various known control such as fuel injection control.

In the PM filter regeneration control, a determination is made by the ECU 16 as to whether or not the amount of the particulate matter trapped on the particulate filter 11 (or the PM trapping amount) is larger than a predetermined upper limit amount. This upper limit amount is set to an amount a little smaller than the maximum amount of the particulate matter that the particulate filter 11 can trap.

In making a determination as to whether or not the PM trapping amount of the particulate filter 11 has reached the upper limit amount, it may be determined that the PM trapping amount of the particulate filter 11 has reached the upper limit amount for example when one of the following conditions is met: the time elapsed since the latest previous execution of the PM filter regeneration process exceeds a predetermined time; the travel distance of the vehicle after the latest previous execution of the PM filter regeneration process is larger than a predetermined distance; and the output signal of the pressure difference sensor 15 is larger than a predetermined value.

The ECU 16 executes the PM filter regeneration process when it is determined according to the above described method that the PM trapping amount of the particulate filter 11 has reached the upper limit amount. In the PM filter regeneration process, the ECU 16 causes the fuel addition valve 11 to add fuel to the exhaust gas to raise the temperature of the particulate filter 11 up into a temperature range that makes it possible to oxidize the particulate matter. In addition, the ECU 16 controls to decrease the degree of opening of the exhaust throttle valve 12.

If the degree of opening of the exhaust throttle valve 12 is decreased while the PM filter regeneration process is performed, the pressure inside the particulate filter 11 (the partial pressure of oxygen) increases. If the PM filter regeneration process is performed in the state in which the pressure inside the particulate filter 11 (which will be hereinafter referred to as the in-filter pressure) has been increased, the rate of oxidation reaction of the particulate matter trapped on the particulate filter 11 increases, and therefore it is possible to shorten the execution time of the PM filter regeneration process.

As per the above, the pressure increasing means in the present invention is realized by the ECU 16 in decreasing the degree of opening of the exhaust throttle valve 12 during the PM filter regeneration process.

In connection with the above, since an increase in the rate of oxidation reaction of the particulate matter leads to an increase in the quantity of heat generated by the oxidation reaction of the particulate matter per unit time, the temperature of the particulate filter 11 is more likely to rise during the high pressure PM filter regeneration process than during the normal PM filter regeneration process (that is, PM filter regeneration process that is performed without decreasing the degree of opening of the exhaust throttle valve 12).

Especially when running conditions of the internal combustion engine 1 can easily change as is the case when the vehicle is moving, it is highly likely that the temperature of the particulate filter 11 rises excessively due to changes in the exhaust gas amount and/or the exhaust gas temperature. This presents the problem that the running condition that allows to perform the high pressure PM filter regeneration process is limited to stationary running conditions such as idling.

In view of this, in the PM filter regeneration control in this embodiment, the ECU 16 is adapted to decrease the in-filter pressure when it is predicted that there is a possibility that the temperature of the particulate filter 11 (which will be hereinafter referred to as the filter temperature) will reach a predetermined upper limit temperature while the high pressure PM filter regeneration process is performed.

The aforementioned upper limit temperature is a temperature a little lower than the temperature that causes thermal deterioration of the particulate filter 11 or the temperature that causes the thermal deterioration of the catalyst supported on the particulate filter 11, whichever is the lower.

The prediction that there is a possibility that the filter temperature will reach the upper limit temperature is made for example when the quantity of the exhaust gas flowing into the particulate filter 11 (which will be hereinafter referred to as the inflowing exhaust gas quantity) is small, when the filter temperature is high, when the amount of the particulate matter trapped on or remaining on the particulate filter 11 (which will be hereinafter referred to as the remaining PM amount), and/or when the load of the internal combustion engine 1 (which will be hereinafter referred to as the engine load) is high.

When the inflowing exhaust gas quantity decreases, the quantity of heat that the exhaust gas takes away from the particulate filter 11 also decreases. Then, the filter temperature is likely to rise. This tendency becomes more pronounced as the inflowing exhaust gas quantity becomes smaller.

When the filter temperature rises, the rate of oxidation reaction of the particulate matter trapped on the particulate filter 11 becomes higher. Then, the filter temperature is likely to rise. This tendency becomes more pronounced as the filter temperature becomes higher.

When the remaining PM amount increases, the quantity of heat generated by oxidation reaction of the particulate matter per unit time also increase. Then, the filter temperature is likely to rise. This tendency becomes more pronounced as the remaining PM amount increases.

When the engine load increases, the temperature of the exhaust gas flowing into the particulate filter 11 rises. The rise in the temperature of the exhaust gas flowing into the particulate filter 11 leads to an increase in the quantity of heat transferred from the exhaust gas to the particulate filter 11 and a decrease in the quantity of heat transferred from the particulate filter 11 to the exhaust gas. Then, the filter temperature is likely to rise. This tendency becomes more pronounced as the engine load becomes higher.

From the above follows that it is possible to prevent the filter temperature to rise to the upper limit temperature by making the in-filter pressure lower as the inflowing exhaust gas quantity becomes smaller, as the filter temperature becomes higher, as the remaining PM amount becomes larger, and/or as the engine load becomes higher.

In view of the above, the ECU 16 is adapted to control the exhaust throttle valve 12 in such a way as to make the in-filter pressure lower as the inflowing exhaust gas quantity becomes smaller, as the filter temperature becomes higher, as the remaining PM amount becomes larger, and/or as the engine load becomes higher.

In the following, a method of controlling the in-filter pressure during the period in which the high pressure PM filter regeneration control is performed. In the period in which the high pressure PM filter regeneration process is performed, the ECU 16 first determines a basic value of the target in-filter pressure (which will be hereinafter referred to as the basic target pressure) using as parameters the inflowing exhaust gas quantity and the remaining PM amount.

Figure 2:
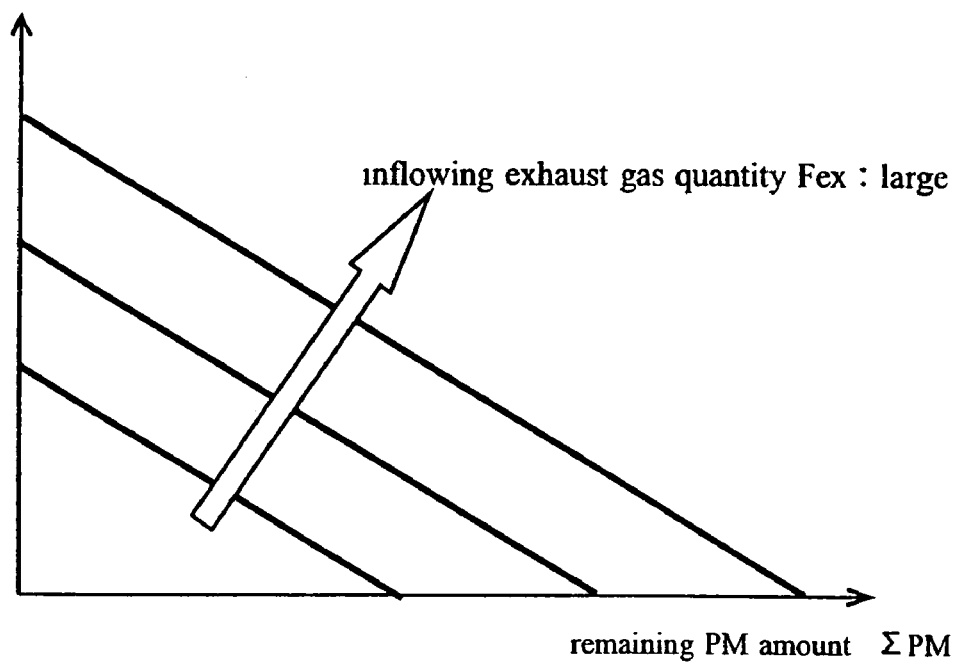
FIG. 2 is a map used in determining a basic target pressure.

FIG. 2 is a map showing the relationship among the inflowing exhaust gas quantity Fex, the amount of the particulate matter trapped on or remaining on the particulate filter (which will be hereinafter referred to as the remaining PM amount) ΣPM and the basic target pressure Pfb.

In the map shown in FIG. 2, the smaller the inflowing exhaust gas quantity Fex is, and the larger the remaining PM amount ΣPM is, the lower the basic target pressure Pfb is set. In other words, the larger the inflowing exhaust gas quantity Fex is, and the smaller the remaining PM amount ΣPM is, the higher the basic target pressure Pfb is set.

Here, as a signal indicative of the inflowing exhaust gas quantity Fex, the output signal of the air flow meter 6 may be used. The remaining PM amount ΣPM can be determined by subtracting the product of the PM oxidation rate (that is, the amount of the particulate matter that is oxidized per unit time) and the time over which the high pressure PM filter regeneration process has been performed from the PM trapping amount at the time of starting the PM filter regeneration process.

The higher the filter temperature is, and the larger the inflowing exhaust gas quantity (or the quantity of oxygen flowing into the particulate filter 11), the higher the PM oxidation rate is. Therefore, the PM oxidation rate can be determined based on the filter temperature and the inflowing exhaust gas quantity as parameters. In connection with this, as a signal indicative of the filter temperature, the output signal of the exhaust temperature sensor 13 may be used.

The PM oxidation rate is also affected by the in-filter pressure in addition to the filter temperature and the inflowing exhaust gas quantity. Therefore, the PM oxidation rate increases as the in-filter pressure becomes higher even if the filter temperature and the inflowing exhaust gas quantity are the same.

In view of this, in this embodiment the ECU 16 is adapted to correct the PM oxidation rate that is obtained based on the filter temperature and the inflowing exhaust gas quantity (which rate will be hereinafter referred to as the basic PM oxidation rate), based on the in-filter pressure.

Figure 3:
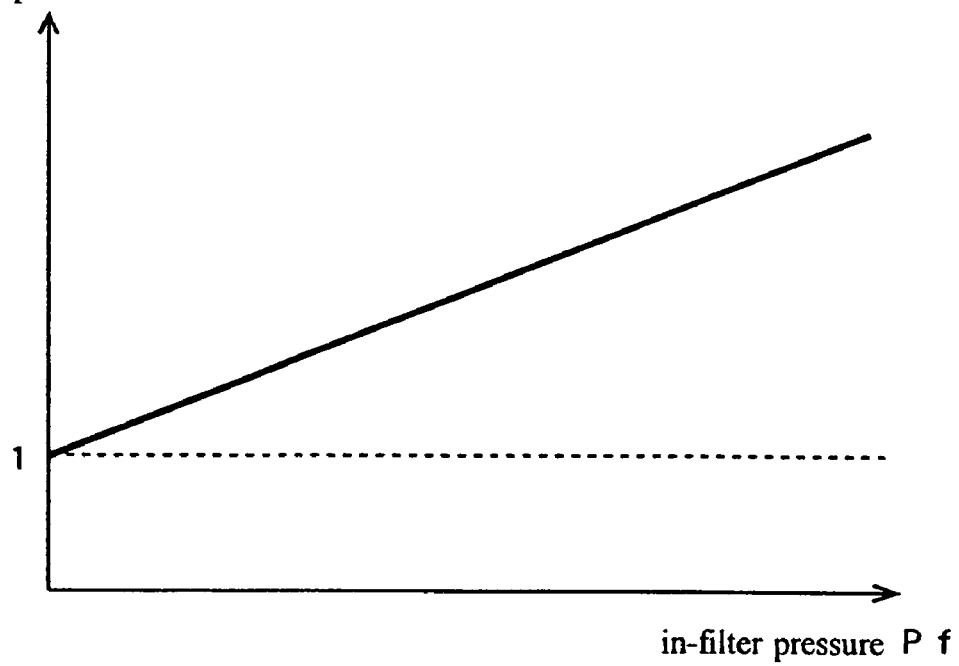
FIG. 3 is a map used in determining a pressure correction coefficient.

FIG. 3 is a map showing the relationship between the in-filter pressure Pf and a value called pressure correction coefficient $\alpha$. In the map shown in FIG. 3, the pressure correction coefficient $\alpha$ is a value equal to or larger than 1 and set in such a way that the higher the in-filter pressure Pf is, the larger the value of the pressure correction coefficient $\alpha$ is.

The ECU 16 determines the pressure correction coefficient $\alpha$ in accordance with the map shown in FIG. 3, and computes the PM oxidation rate by multiplying the aforementioned basic PM oxidation rate by the pressure correction coefficient $\alpha$ (basic PM oxidation amount×$\alpha$).

Using the PM oxidation rate thus determined, it is possible to estimate the remaining PM amount with high accuracy. Although a case in which the basic PM oxidation rate determined by the filter temperature and the inflowing exhaust gas quantity is corrected based on the in-filter pressure has been described in connection with this embodiment, the relationship among the filter temperature, the inflowing exhaust gas quantity, the in-filter pressure and the PM oxidation rate may be prepared in advance in the form of a map, alternatively.

Next, the ECU 16 determines a target value of the in-filter pressure (which will be hereinafter referred to as the target pressure) Pft by correcting the basic target pressure Pfb based on the filter temperature and the engine load.

Figure 4:
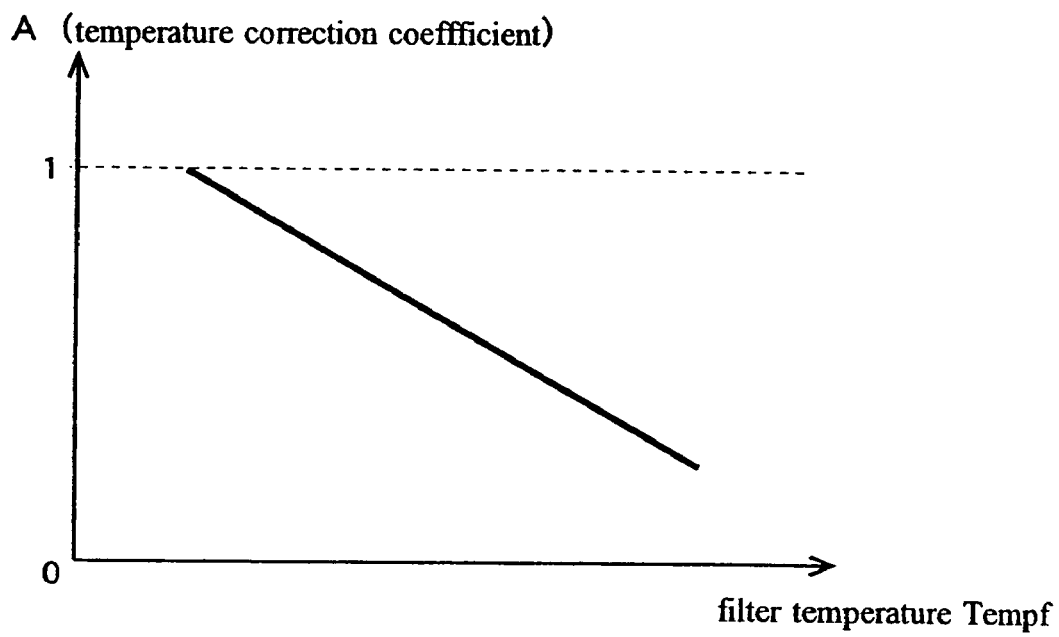
FIG. 4 is a map used in determining a temperature correction coefficient.

FIG. 4 is a map used for determining a correction coefficient A associated with the filter temperature Tempf (which coefficient will be hereinafter referred to as the temperature correction coefficient). In the map of FIG. 4, the temperature correction coefficient A is a positive number equal to or smaller than 1, and the higher the filter temperature Tempf is, the lower the temperature correction coefficient A is set.

Figure 5:
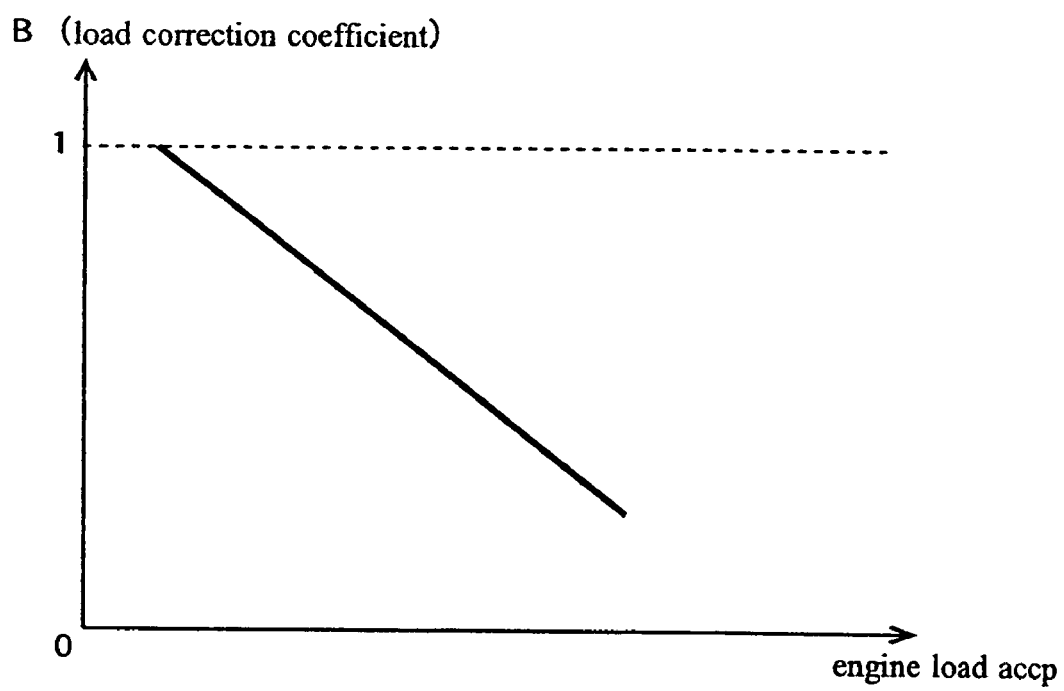
FIG. 5 is a map used in determining a load correction coefficient.

FIG. 5 is a map for determining a correction coefficient B associated with the engine load Accp (which coefficient will be hereinafter referred to as the load correction coefficient). As a signal indicative of the engine load Accp, the output signal of the accelerator position sensor 17 may be used. In the map of FIG. 5, the load correction coefficient B is a positive number equal to or smaller than 1, and the higher the engine load Accp is, the lower the load correction coefficient B is set.

The ECU 16 determines the basic target pressure Pfb, the temperature correction coefficient A and the load correction coefficient B based on the maps shown in FIGS. 2 to 5, and in addition computes the target pressure Pft by multiplying the basic target pressure Pfb by the temperature correction coefficient A and further by the load correction coefficient B (Pfb×A×B). Then, the ECU 16 adjusts the degree of opening of the exhaust throttle valve 12 in such a way as to make the actual in-filter pressure Pf equal to the aforementioned target pressure Pft.

If the adjustment of the degree of opening of the exhaust throttle valve 12 is performed in the above described manner repeatedly while the high pressure PM filter regeneration process is executed, the in-filter pressure is reduced when there is a possibility that the filter temperature will rise to the upper limit temperature, such as when the inflowing exhaust quantity is small, when the filter temperature is high, when the remaining PM amount is large, and/or when the engine load is high. On the other hand, the in-filter pressure is increased when the possibility that the filter temperature will rise to the upper limit temperature is low, such as when the inflowing exhaust gas quantity is large, when the filter temperature is low, when the remaining PM amount is small, and/or when the engine load is low. Thus, the prediction means and the pressure decreasing means in the present invention are realized.

The possibility that the temperature of the particulate filter 11 rises excessively becomes high when the inflowing exhaust gas quantity is excessively small, when the filter temperature is close to the upper limit temperature, when the remaining PM amount is excessively large, or when the engine load is excessively high. Therefore, it is preferred that the ECU 16 be adapted to stop, in such cases, the high pressure PM filter regeneration process (namely, to adjust the degree of opening of the exhaust throttle valve 12 back to a normal degree of opening) immediately.

Figure 6:
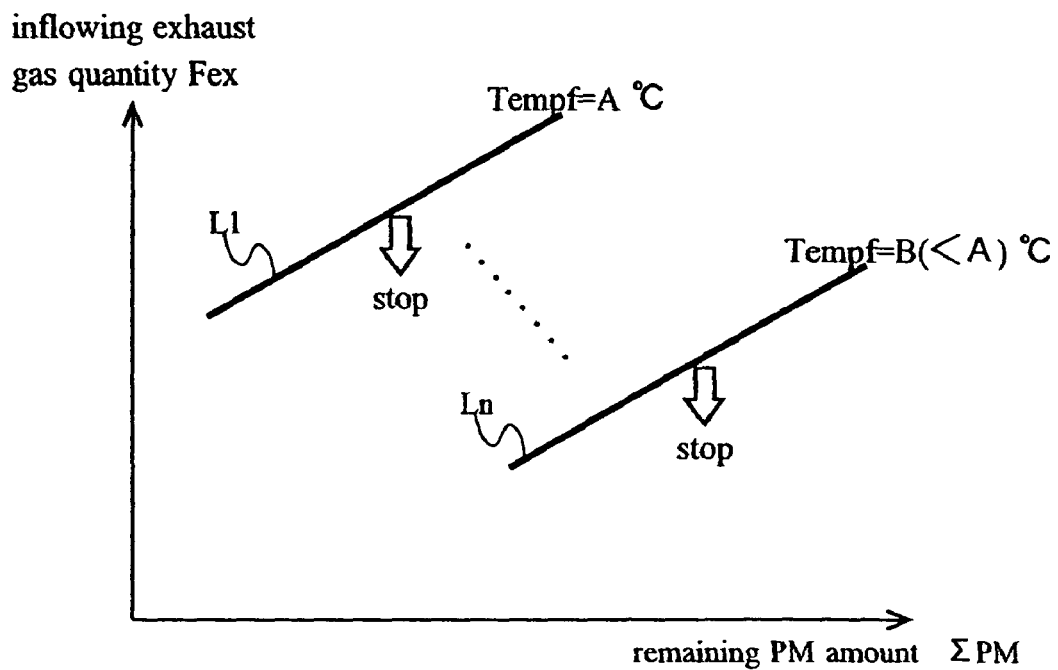
FIG. 6 is a graph showing a high pressure PM filter regeneration process prohibition region that is determined depending on the inflowing exhaust gas quantity, the remaining PM amount and the filter temperature.
Figure 7:
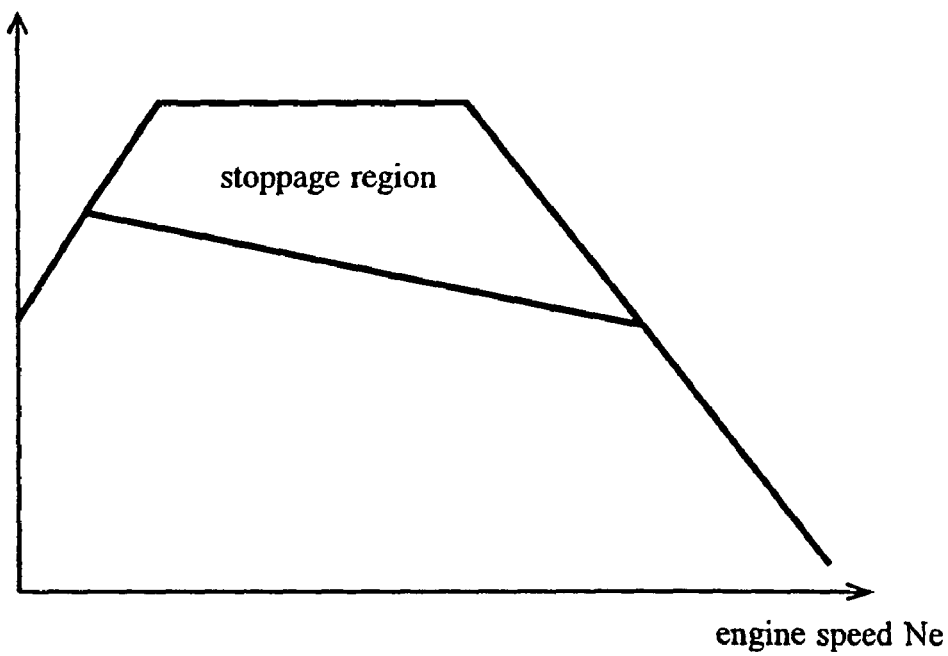
FIG. 7 is a graph showing a high pressure PM filter regeneration process prohibition region that is determined depending on the engine load and the engine speed.

FIGS. 6 and 7 are maps that define conditions for stopping the high pressure PM filter regeneration process. Firstly, FIG. 6 is a map that defines a prohibition condition that is defined in terms of the inflowing exhaust gas quantity Fex, the remaining PM amount $\Sigma$PM and the filter temperature Tempf as parameters. In the case shown in FIG. 6, if the point specified by the inflowing exhaust gas quantity Fex and the remaining PM amount $\Sigma$PM falls within the area below a boundary line (L1, ..., Ln: n is an integer) that is set for each filter temperature Tempf, the high pressure PM filter regeneration process is stopped. Each of the boundary lines L1 to Ln is set in such a way that the high pressure PM filter regeneration process is stopped when the inflowing exhaust gas quantity is small and the remaining PM amount $\Sigma$PM is large.

The boundary line L1 for the filter temperature Tempf of A is set in such a way that the high pressure PM filter regeneration process is stopped when the inflowing exhaust gas is larger and the remaining PM amount is smaller than the corresponding conditions defined by the boundary line Ln for the filter temperature Tempf of B (smaller than A).

FIG. 7 is a map that defines a prohibition condition in terms of the engine load Accp and the engine speed Ne as parameters. If the degree of opening of the exhaust throttle valve 12 is set low when the engine load Accp is high, the possibility that the filter temperature Tempf will reach the upper limit temperature becomes high and it is possible that the drivability is deteriorated. When the engine speed Ne is high to a certain extent, the exhaust gas quantity discharged from the internal combustion engine 1 is large. In such a state, if the degree of opening of the exhaust throttle valve 12 is set low, there is a possibility that the in-filter pressure Pf becomes excessively high. Therefore, in the case shown in FIG. 7, the condition is set in such a way that the high pressure PM filter regeneration process is stopped in the area in which the engine load Accp is high and the engine speed Ne is high.

In some cases, the running condition of the internal combustion engine 1 enters the region in which fuel cut is to be effected, while the high pressure PM filter regeneration process is being performed in the above-described way. If fuel cut is effected in the state in which the degree of opening of the exhaust throttle valve 12 is set low, unnecessary exhaust brake acts on the internal combustion engine 1. This may possibly deteriorate the drivability.

One method for avoiding this is to adjust the degree of opening of the exhaust throttle valve 12 back to a normal degree of opening as long as fuel cut is performed. By adjusting the degree of opening of the exhaust throttle valve 12 back to the normal degree of opening during the fuel cut period, it is possible to prevent unnecessary exhaust brake from acting. In this case, however, a large quantity of low temperature air passes through the particulate filter 11, and there is a possibility that the temperature of the particulate filter 11 becomes lower than temperatures that enable oxidation of particulate matter.

If the temperature of the particulate filter 11 becomes lower than temperatures that enable oxidation of particulate matter while fuel cut is being performed, it is necessary, upon restarting the PM filter regeneration process after fuel cut is ended, to raise the temperature of the particulate filter 11 again up into the temperature region in which the oxidation of the particulate matter is possible. This may leads to disadvantages such as a decrease in gas mileage.

In view of this, in the PM filter regeneration control in this embodiment, the ECU 16 is adapted to continue, when the running condition of the internal combustion engine enters the region in which fuel cut is to be effected while the high pressure PM filter regeneration process is being performed, fuel injection to inject a certain quantity of fuel without effecting fuel cut.

By continuing fuel injection to inject a certain quantity (Qf/c) of fuel in the state in which fuel cut is to be effected while the high pressure PM filter regeneration process is performed, it is possible to prevent deterioration in the drivability, since a torque that cancels the exhaust brake is generated by the internal combustion engine 1. In addition, since the temperature of the exhaust gas is kept high by injection of a certain quantity of fuel, it is possible to oxidize the particulate matter trapped on the particulate filter 11 even in the state in which fuel cut is to be effected.

Figure 8:
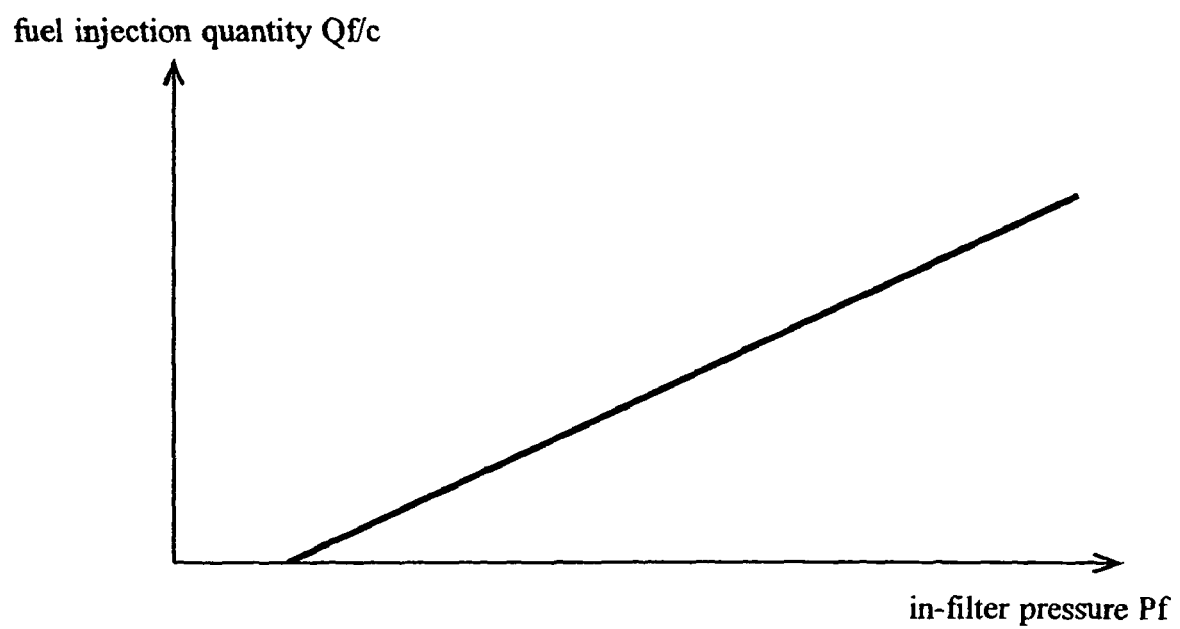
FIG. 8 is a map used in determining the fuel injection quantity in the state in which fuel cut is to be effected.

Since the higher the in-filter pressure Pf is, the larger the braking force acting on the internal combustion engine 1 becomes, it is preferred that the higher the in-filter pressure Pf is, the larger the aforementioned fuel injection quantity Qf/c be made, as shown in FIG. 8.

If the fuel injection quantity Qf/c is increased/decreased in proportion to the in-filter pressure Pf, the internal combustion engine 1 produces a torque proportional to the braking force of the exhaust brake. Therefore, deterioration in the drivability can be prevented.

As per the above, the fuel injection means in the present invention is realized by adjusting the fuel injection quantity through the fuel injection valve 3 to the fuel injection quantity Qf/c proportional to the in-filter pressure Pf, under a control by the ECU 16, when the running condition of the internal combustion engine enters the region in which fuel cut is to be effected while the high pressure PM filter regeneration process is being performed.

Figure 9:
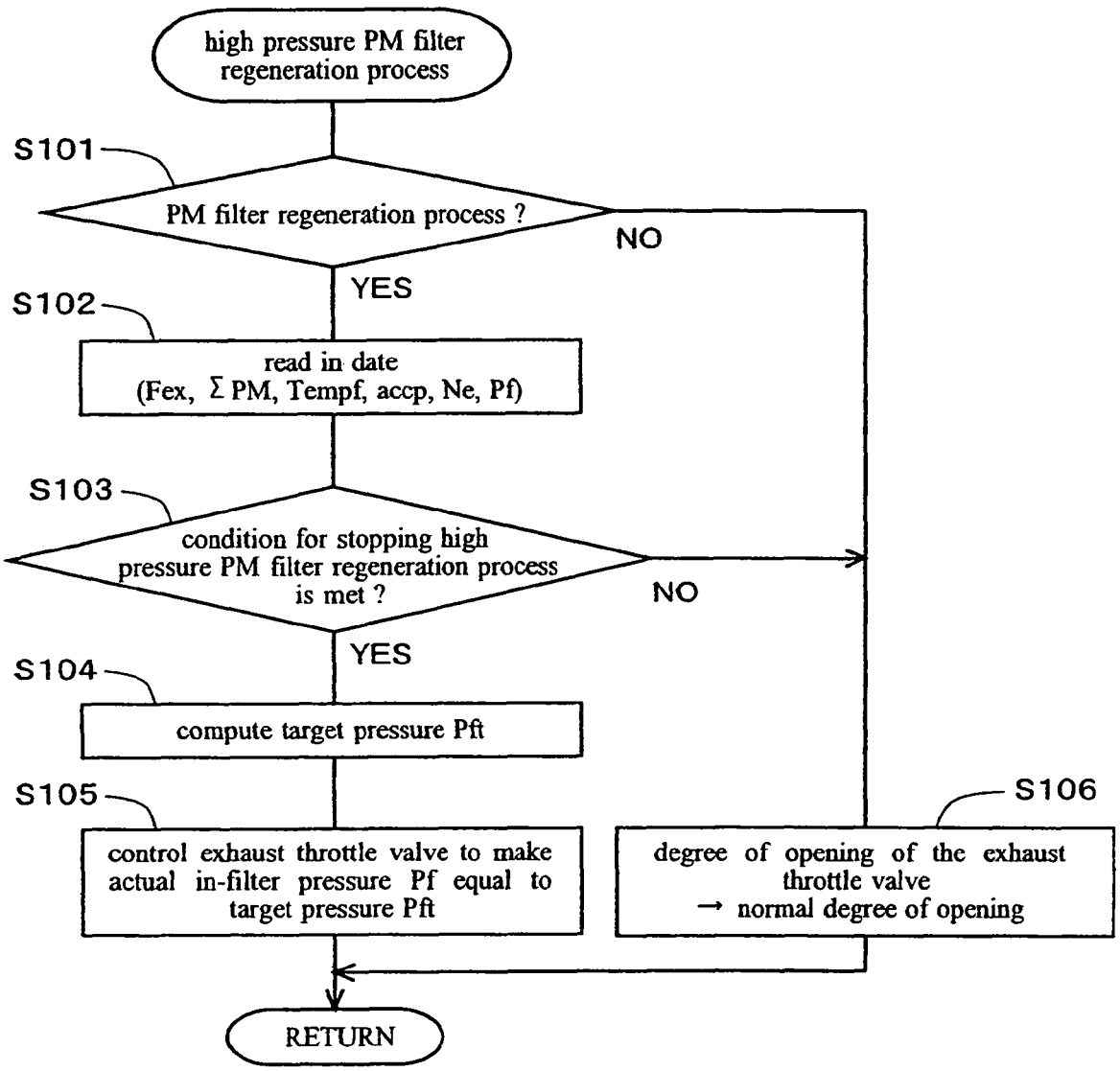
FIG. 9 is a flow chart of a high pressure regeneration routine in the first embodiment.
Figure 10:
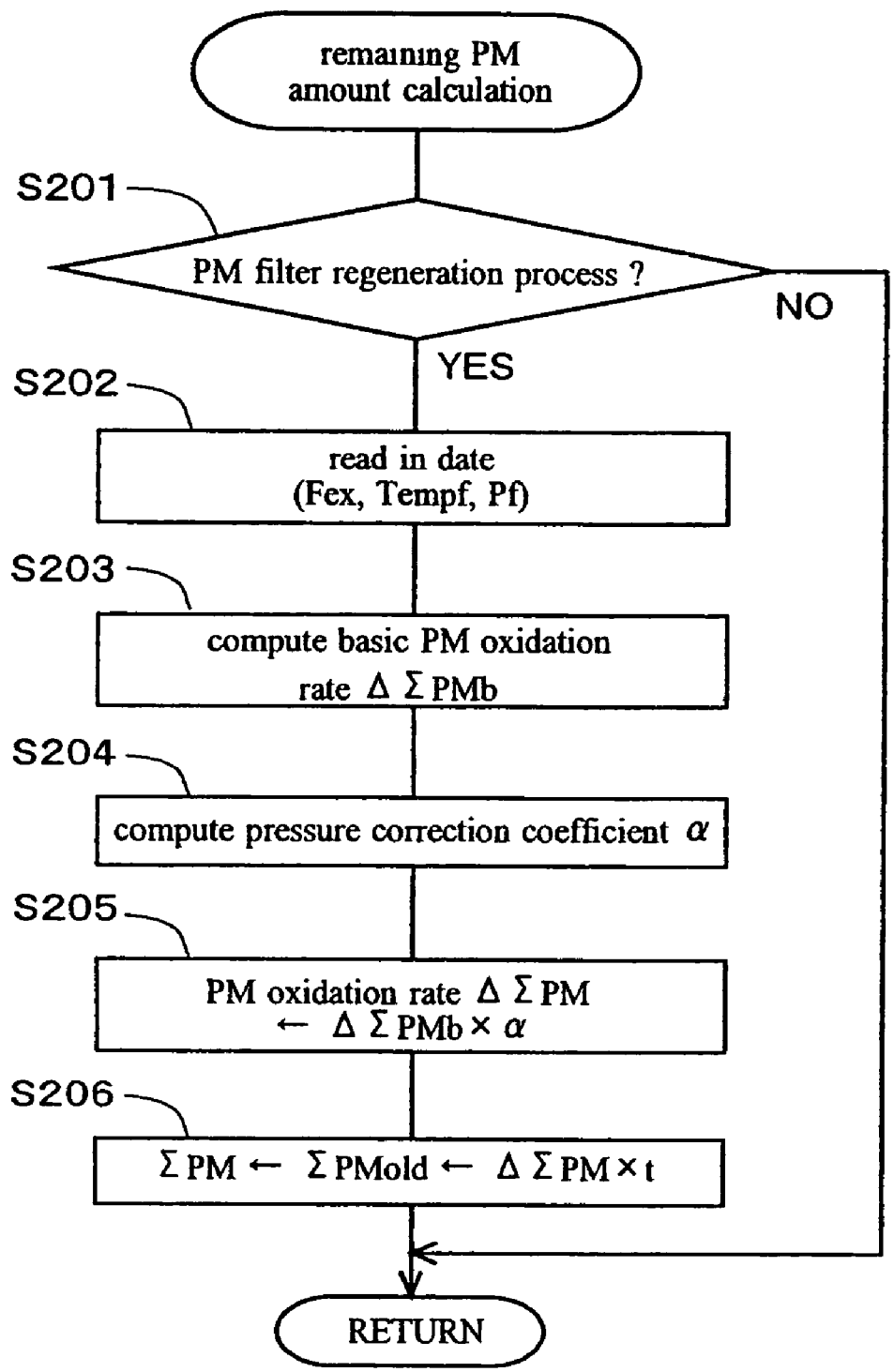
FIG. 10 is a flow chart of a remaining PM amount calculation routine in the first embodiment.
Figure 11:
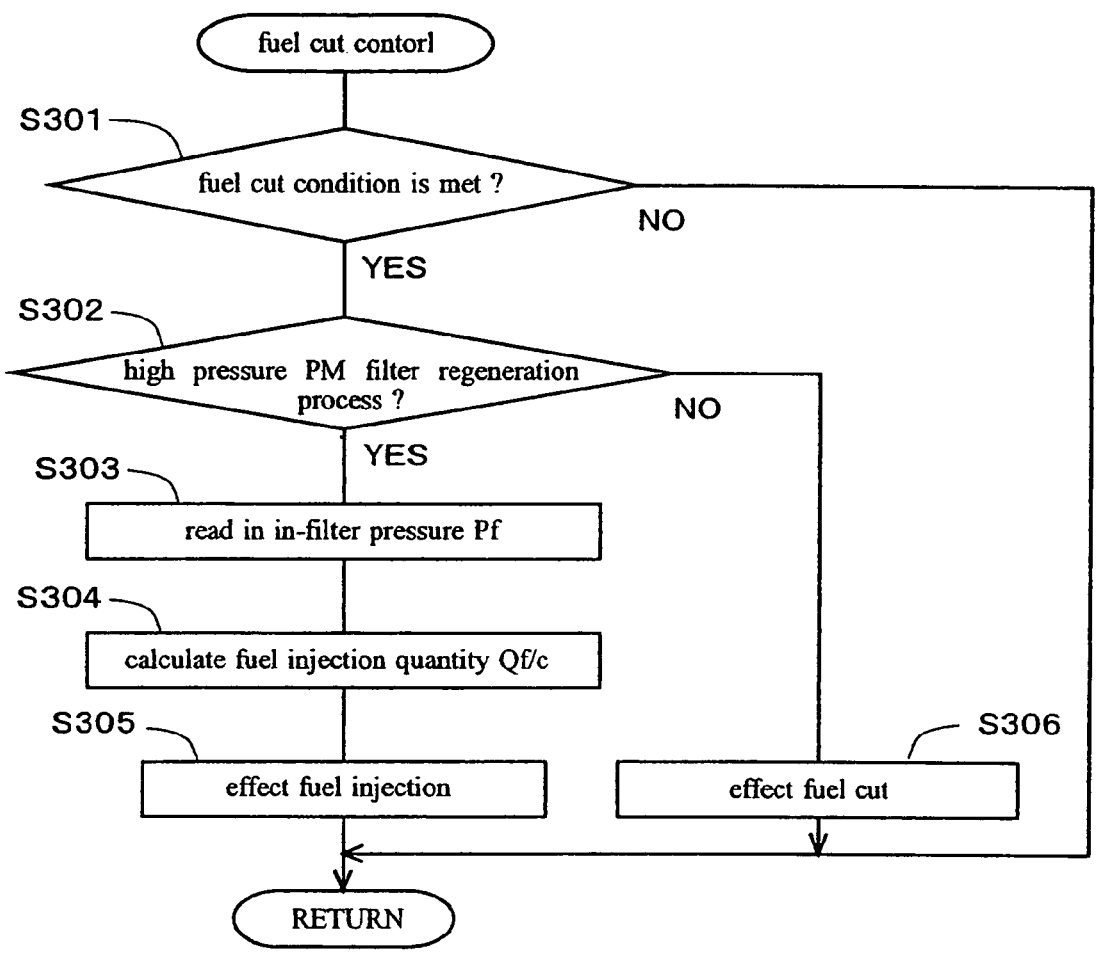
FIG. 11 is a flow chart of a fuel cut control routine in the first embodiment.

In the following, the high pressure PM filter regeneration process in this embodiment will be described with reference to FIGS. 9 to 12. FIG. 9 is a flow chart of a high pressure PM filter regeneration routine. FIG. 10 is a flow chart of a remaining PM amount calculation routine. FIG. 11 is a flow chart of a fuel cut control routine. The high pressure PM filter regeneration routine, the remaining PM amount calculation routine and the fuel cut control routine are stored in advance in a ROM of the ECU 16, and executed by the ECU 16 repeatedly at regular intervals.

First, in the high pressure PM filter regeneration routine shown in FIG. 9, a determination is made by the ECU 16 in step S101 as to whether the PM filter regeneration process is currently performed or not.

If the question in step S101 is answered in the negative, the process of the ECU 16 proceeds to step S106, where the degree of opening of the exhaust valve 12 is adjusted to the normal degree of opening, and then execution of this routine is once terminated.

If the question in step S101 is answered in the affirmative, the process of the ECU 16 proceeds to step S102. In step S102, the ECU 16 reads in the inflowing exhaust gas quantity Fex (i.e. the output signal of the air flow meter 6) the remaining PM amount ΣPM, the filter temperature Tempf (i.e. the output signal of the exhaust gas temperature sensor 13), the engine load Accp (i.e. the output signal of the accelerator position sensor 17), the engine speed Ne and the in-filter pressure Pf (i.e. the output signal of the exhaust gas pressure sensor 14).

The remaining PM amount ΣPM mentioned above is calculated by the remaining PM amount calculation routine shown in FIG. 10. In the remaining PM amount calculation routine, firstly in step S201, a determination is made by the ECU 16 as to whether the PM filter regeneration process is currently performed or not.

If the question in step S201 is answered in the negative, the ECU 16 once terminates execution of this routine. If the question in step S201 is answered in the affirmative, the ECU 16 reads in, in step S202, the inflowing exhaust gas quantity Fex (i.e. the output signal of the air flow meter 6), the filter temperature Tempf (i.e. the output signal of the exhaust gas temperature sensor 13), and the in-filter pressure Pf (i.e. the output signal of the exhaust gas pressure sensor 14).

In step S203, the ECU 16 computes the basic PM oxidation rate ΔΣPMb using as parameters the inflowing exhaust gas quantity Fex and the filter temperature Tempf that have been read in step S202.

In step S204, the ECU 16 computes the pressure correction coefficient α based on the in-filter pressure Pf that has been read in step S202 and the map of FIG. 3 described before.

In step S205, the ECU 16 computes the PM oxidation rate ΔΣPM by multiplying the basic PM oxidation rate ΔΣPMb obtained in step S203 by the pressure correction coefficient α obtained in step S202 (αΣPM=αΣPMb×α).

In step S206, the ECU 16 computes the amount of the particulate matter that has been oxidized since the latest previous execution of this routine until now by multiplying the PM oxidation rate ΔΣPM obtained in step S205 by the time t elapsed since the latest previous execution of this routine until now (ΔΣPM×t). Subsequently, the ECU 16 computes the current remaining PM amount ΔΣPM by subtracting the aforementioned amount of particulate matter ΔΣPM×t from the previous remaining PM amount ΔΣPMold computed in the latest previous execution of this routine (ΔΣPMold−ΔΣPM×t).

Referring back to the high pressure PM filter regeneration routine shown in FIG. 9, in step S103, a determination is made by the ECU 16 as to whether or not the condition for stopping the high pressure PM filter regeneration process is met based on the inflowing exhaust gas quantity Fex, the filter temperature Tempf, the remaining PM amount ΣPM, and the engine load Accp that have been read in step S102 as parameters.

Specifically, a determination is made by the ECU 16 as to whether or not the condition of the particulate filter 11 is in the region in which the high pressure PM filter regeneration process is to be stopped, based on the inflowing exhaust gas quantity Fex, the filter temperature Tempf, the remaining PM amount ΣPM and the above described map of FIG. 6. In addition, a determination is made by the ECU 16 as to whether or not the engine load Accp is in the region in which the high pressure PM filter regeneration process is to be stopped, based on the engine load Accp and the above described map of FIG. 7.

If it is determined that the condition of the particulate filter 11 is in the region in which the high pressure PM filter regeneration process is to be stopped and/or that the engine load Accp is in the region in which the high pressure PM filter regeneration process is to be stopped, the process of the ECU 16 proceeds to step S106. In step S106, the ECU 16 controls the degree of opening of the exhaust throttle valve 12 to the normal degree of opening.

In this case, with stoppage of the high pressure PM filter regeneration process, excessive temperature rise of the particulate filter 11 and deterioration in the drivability of the internal combustion engine 1 are prevented from occurring.

On the other hand, if it is determined that the condition of the particulate filter 11 is not in the region in which the high pressure PM filter regeneration process is to be stopped and the engine load Accp is not in the region in which the high pressure PM filter regeneration process is to be stopped, it is considered that the condition for stopping the high pressure PM filter regeneration process is not met, and the process of the ECU 16 proceeds to step S104.

In step S104, the ECU 16 determines a target pressure Pft by computation. Specifically, the ECU 16 computes the target pressure Pft based on the inflowing exhaust gas quantity Fex, the remaining PM amount ΣPM, the filter temperature Tempf, and the engine load Accp using the maps of FIGS. 2, 4 and 5, as described before.

In step S105, the ECU 16 controls the degree of opening of the exhaust throttle valve 12 in such a way that the actual in-filter pressure Pf (i.e. the output signal of the exhaust gas pressure sensor 14) becomes equal to the target pressure Pft mentioned above.

For example, the ECU 16 calculates a difference ΔPf (=Pft−Pf) by subtracting the actual in-filter pressure Pf from the target pressure Pft. Then, the ECU 16 determines a degree of opening correction amount Δθ for the exhaust throttle valve 12 from the aforementioned difference ΔPf and the map presented as FIG. 12.

Figure 12:
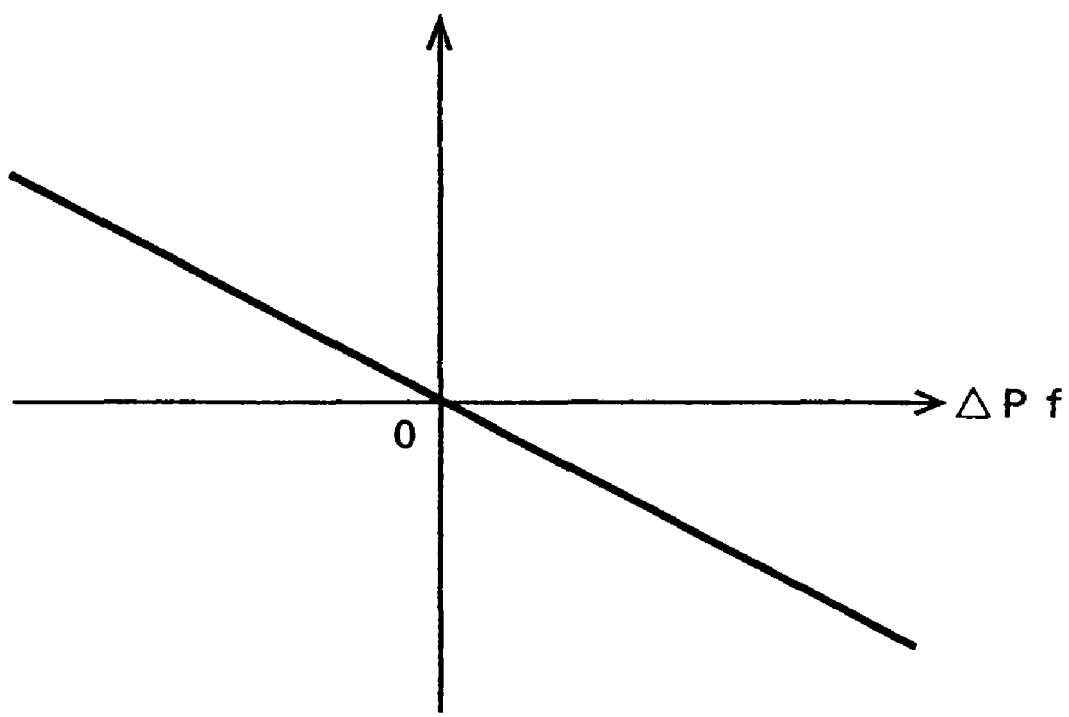
FIG. 12 is a map used in determining a degree of opening correction amount for the exhaust throttle valve.

In the map of FIG. 12, when the aforementioned difference ΔPf is positive (namely, Pft>Pf), the degree of opening correction amount Δθ has a negative value, and it is set in such a way that the larger the aforementioned difference ΔPf is, the smaller the degree of opening correction amount Δθ is (i.e. the larger the absolute value |Δθ| is). On the other hand, when the aforementioned difference ΔPf is negative (namely, Pft<Pf), the degree of opening correction amount Δθ has a positive value, and it is set in such a way that the smaller the aforementioned difference ΔPf is, the larger the degree of opening correction amount Δθ is (i.e. the larger the absolute value |Δθ| is).

After the degree of opening correction amount Δθ for the exhaust throttle valve 12 has been determined based on the difference ΔPf and the map shown in FIG. 12, the ECU 16 controls the exhaust throttle valve 12 to change the degree of opening of the exhaust throttle valve 12 by an amount equal to that degree of opening correction amount Δθ (where the degree of opening of the valve is increased when Δθ is positive, and decreased when Δθ is negative).

By repeated execution of the routines shown in FIGS. 9 and 10 by the ECU 16 while the high pressure PM filter regeneration process is performed, the in-filter pressure Pf is made lower when there is a possibility that the filter temperature will rise to the upper limit temperature as is the case when the inflowing exhaust gas quantity Fex is small, when the filter temperature Tempf is high, when the remaining PM amount ΣPM is large and/or when the engine load Accp is high. Accordingly, it is possible to perform the high pressure PM filter regeneration process while suppressing excessive temperature rise of the particulate filter 11, even while the vehicle is moving. On the other hand, when the possibility that the filter temperature will rise to the upper limit temperature is low as is the case when the inflowing exhaust gas quantity is large, when the filter temperature is low, when the remaining PM amount is small and/or when the engine load is low, the in-filter pressure Pf becomes high. Therefore, it is possible to shorten the time required for executing the PM filter regeneration process.

Next, referring the fuel cut control routine shown in FIG. 11, a determination is made by the ECU 16 in step S301 as to whether or not the condition for performing fuel cut is met. The condition for performing fuel cut may be, for example, that the degree of opening of the accelerator (that is, the output signal of the accelerator position sensor 17) is zero and the engine speed is higher than a predetermined speed.

If the question in step S301 is answered in the negative, the ECU 16 once terminates execution of this routine. On the other hand, if the question in step S301 is answered in the affirmative, the process of the ECU 16 proceeds to step S302.

In step S302, a determination is made by the ECU 16 as to whether or not the high pressure PM filter regeneration process is currently performed. If the question in step S302 is answered in the negative, the ECU 16 controls to perform fuel cut (namely, to stop fuel injection) in step S306, and terminates execution of this routine. On the other hand, if the question in step S302 is answered in the affirmative, the process of the ECU 16 proceeds to step S303. In step S303, the ECU 16 reads in the in-filter pressure (namely, the output signal of the exhaust gas pressure sensor 14) Pf.

In step S304, the ECU 16 computes the fuel injection quantity Qf/c based on the in-filter pressure Pf read in step S303 and the map of FIG. 8 described before.

In step S305, the ECU 16 causes the fuel injection valve to inject fuel with the fuel injection quantity Qf/c computed in the above described step S304.

By continuing fuel injection with the quantity Qf/c that is determined in relation to the in-filter pressure Pf without performing fuel cut even if the condition for performing fuel cut is met while the high pressure PM filter regeneration process is performed, it is possible to prevent unnecessary exhaust brake from acting. In addition, it is thereby possible to keep the filter temperature Tempf within the temperature range in which oxidation of particulate matter is possible.

Therefore, it is possible to prevent deterioration in the drivability and to continue the high pressure PM filter regeneration process even if the condition for performing fuel cut is met while the high pressure PM filter regeneration process is performed.

According to the embodiment described in the foregoing, it is possible to perform the high pressure PM filter regeneration process while preventing excessive temperature rise of the particulate filter 11 even when the running conditions of the internal combustion engine 1 can easily change as is the case when the vehicle is moving, and in addition, it is possible to prevent deterioration in the drivability caused by the high pressure PM filter regeneration process.

Second Embodiment

Next, a second embodiment of the exhaust gas purification system according to the present invention will be described with reference to FIGS. 13 to 14. Here, only structures that are different from the above described first embodiment will be described, and descriptions of structures similar to those in the first embodiment will be omitted.

Figure 13:
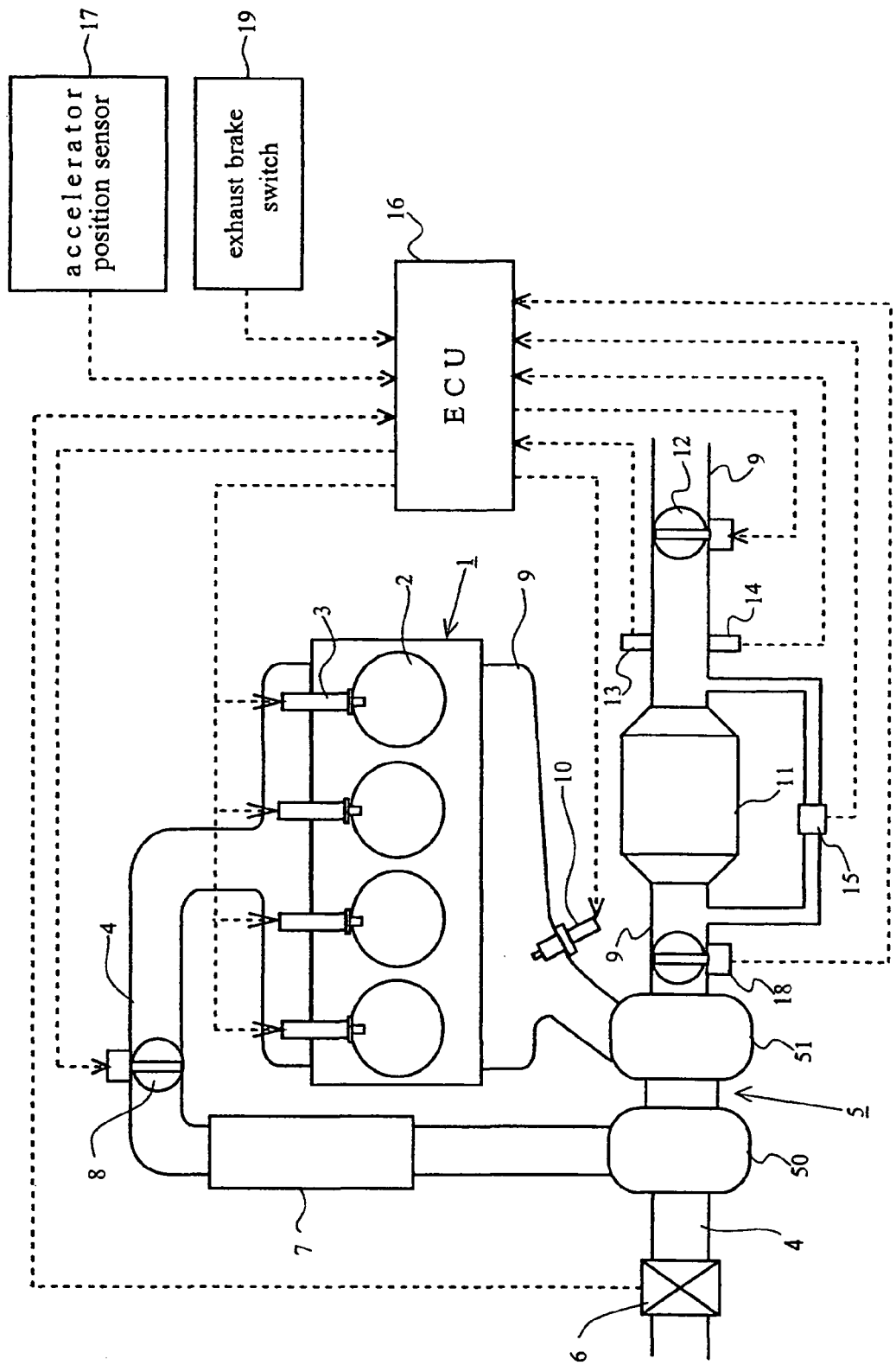
FIG. 13 is a diagram schematically showing the structure of the internal combustion engine according to a second embodiment.

FIG. 13 is a diagram schematically showing the structure of an internal combustion engine 1 according to this embodiment. In FIG. 13. a flow rate regulation valve 18 is provided in the exhaust passage 9 upstream of the particulate filter 11. The flow rate regulation valve 18 is adapted to be controlled electrically by the ECU 16. In addition, an exhaust brake switch 19 is connected to the ECU 16.

When the exhaust brake switch 19 is turned on, the ECU 16 controls to decrease the degree of opening of the exhaust throttle valve 12. A decrease in the degree of opening of the exhaust throttle valve 12 leads to an increase in frictions acting on the internal combustion engine 1 due to an increase in the exhaust gas pressure, whereby a braking force (namely, exhaust brake) acts on the internal combustion engine 1.

When the degree of opening of the exhaust throttle valve 12 is further increased while the high pressure PM filter regeneration process is performed in order to activate exhaust brake, there is a possibility that the in-filter pressure Pf rises excessively and, at the same time, that the inflowing exhaust gas quantity Fex decreases excessively. If the in-filter pressure Pf becomes excessively high and the inflowing exhaust gas quantity Fex becomes excessively small simultaneously, the possibility that the temperature of the particulate filter 11 rises excessively becomes high due to the combined effect of an increase in the particulate matter oxidation rate and a decrease in the quantity of heat that is carried away from the particulate filter 11 by the exhaust gas.

In view of this, in this embodiment when the exhaust brake switch 19 is turned on while the high pressure PM filter regeneration process is being performed, a prediction is made by the ECU 16 as to whether or not there is a possibility that the temperature of the particulate filter 11 will rise excessively if exhaust brake is activated (namely, if the in-filter pressure is increased).

For example, it is predicted by the ECU 16 that there is a possibility that the temperature of the particulate filter 11 will rise excessively if exhaust brake is activated when at least one of the following conditions is met: (1) the inflowing exhaust gas quantity Fex is smaller than a predetermined flow rate; (2) the remaining PM amount ΣPM is larger than or equal to a predetermined PM amount; and (3) the filter temperature Tempf is larger than or equal to a predetermined temperature. On the other hand, if none of the above described conditions (1) to (3) are met, it is predicted by the ECU 16 that there is no possibility that the temperature of the particulate filter 11 will rise excessively if exhaust brake is activated.

Figure 14:
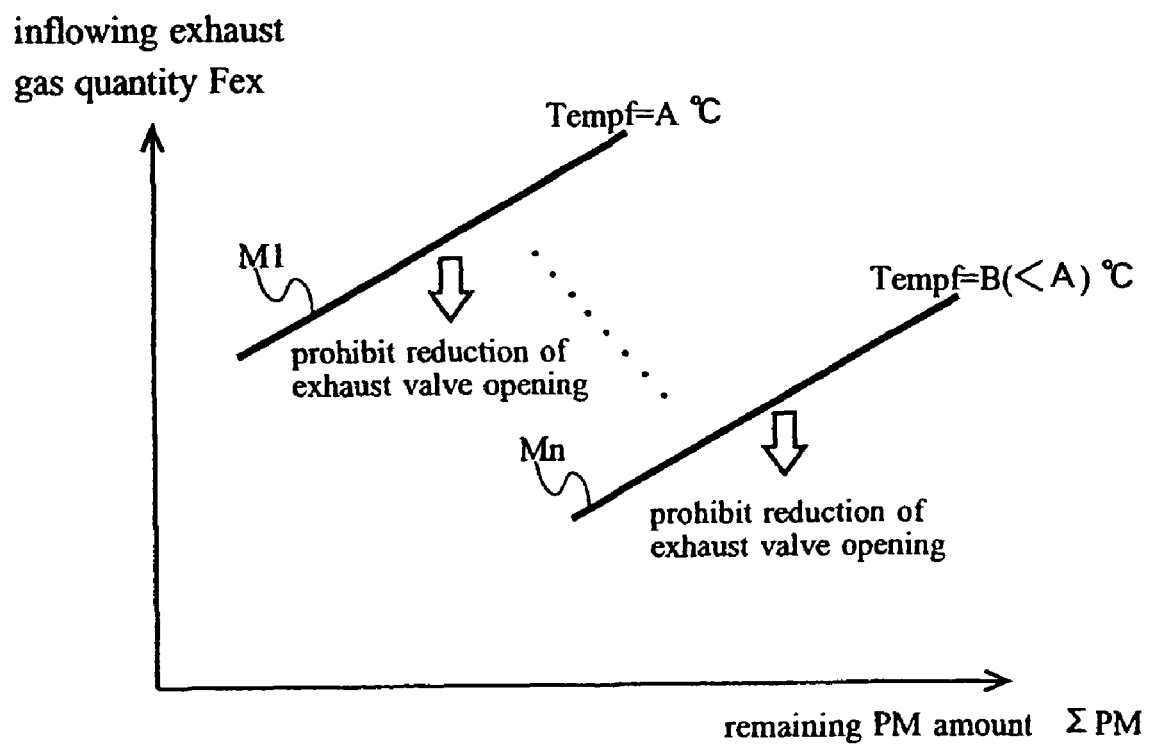
FIG. 14 is a graph showing a region in which reduction of the degree of opening of the exhaust throttle valve is prohibited, the region being determined based on the inflowing exhaust gas quantity and the remaining PM amount.

In connection with the above, the ECU 16 may use a map shown in FIG. 14 in making a determination as to whether or not there is a possibility that the temperature of the particulate filter 11 will rise excessively. The map shown in FIG. 14 defines, in terms of the inflowing exhaust gas quantity Fex, the remaining PM amount Z PM and the filter temperature Tempf as parameters, the region in which reduction of the degree of opening of the exhaust throttle valve 12 is prohibited (the exhaust throttling prohibition region). In FIG. 14, when the point specified by the inflowing exhaust gas quantity Fex and the remaining PM amount ΣPM falls within the area below a boundary line (M1, . . . , Mn: n is an integer) that is set for each filter temperature Tempf, reduction of degree of opening of the exhaust throttle valve 12 is prohibited. When it is determined based on such a map that reduction of the degree of opening of the exhaust throttle valve 12 is to be prohibited, the ECU 16 regards that there is a possibility that the temperature of the particulate filter 11 will rise excessively if exhaust brake is activated by reducing the degree of opening of the exhaust throttle valve 12.

When it is predicted by the above described method that there is no possibility that the temperature of the particulate filter 11 will rise excessively, the ECU 16 controls to activate exhaust brake by reducing the degree of opening of the exhaust throttle valve 12. On the other hand, when it is predicted that there is a possibility that the temperature of the particulate filter 11 will rise excessively, the ECU 16 controls to activate exhaust brake by reducing the degree of opening of the flow rate regulation valve 18.

By selectively utilizing the exhaust throttle valve 12 and the flow rate regulation valve 18 to activate exhaust brake, it is possible to activate exhaust brake while preventing an excessive temperature rise of the particulate filter 11.

Figure 15:
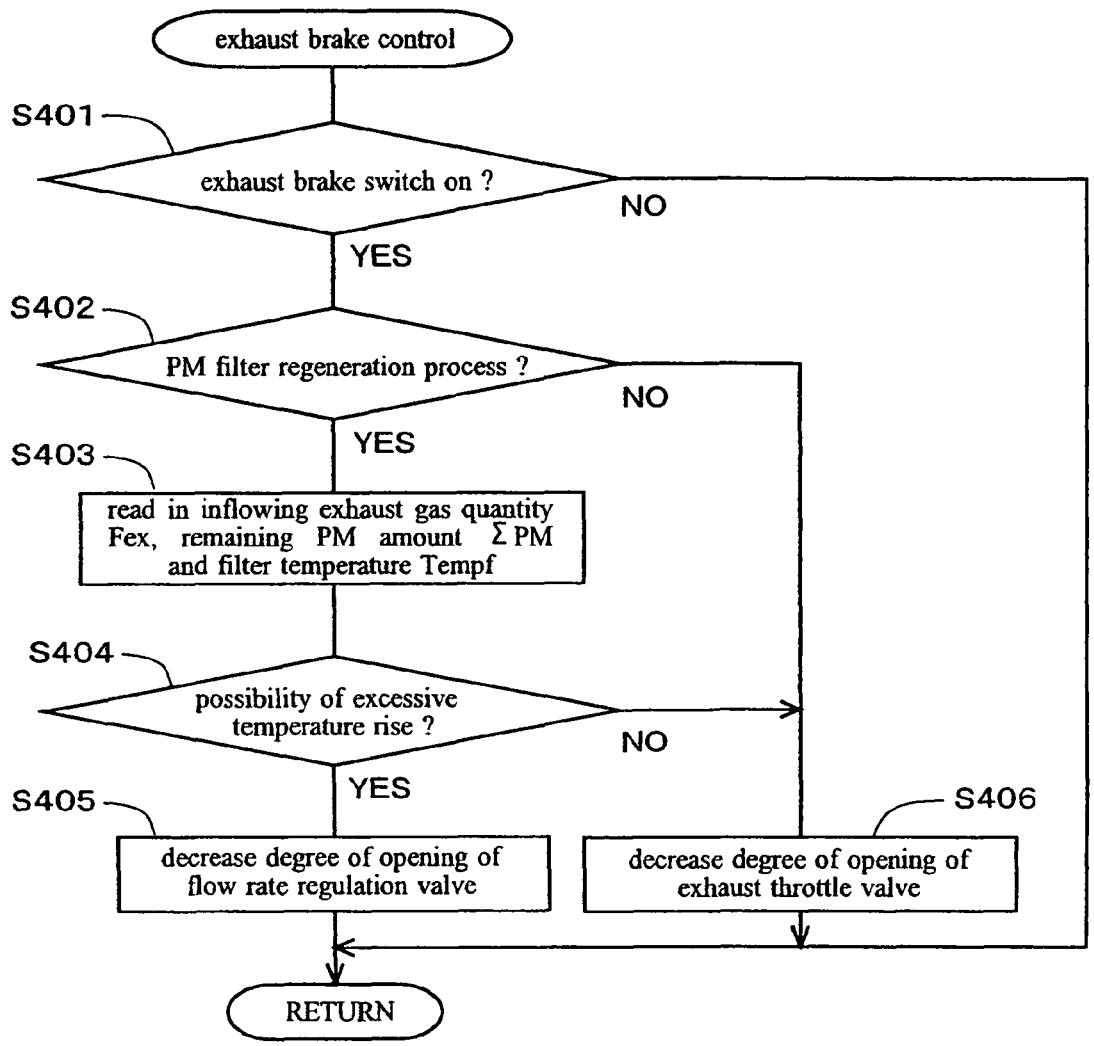
FIG. 15 is a flow chart of an exhaust brake control routine in the second embodiment.

In the following, an exhaust brake control process in this embodiment will be described with reference to FIG. 15. FIG. 15 is a flow chart of an exhaust brake control routine. The exhaust brake control routine is stored in advance in the ROM of the ECU 16 and executed repeatedly by the ECU 16 at certain regular intervals.

In the exhaust brake control routine, firstly in step S401, a determination is made by the ECU 16 as to whether the exhaust brake switch 19 is on or not.

If the question in step S401 is answered in the negative, the ECU 16 once terminates execution of this routine. On the other hand, if the question in step S401 is answered in the affirmative, the process of the ECU 16 proceeds to step S402.

In step S402, a determination is made by the ECU 16 as to whether or not the PM filter regeneration process (either the high pressure PM filter regeneration process or the normal PM filter regeneration process) is currently performed. If the question in step S402 is answered in the negative (namely, if neither the high pressure PM filter regeneration process nor the normal PM filter regeneration process is performed), the process of the ECU 16 proceeds to step S406, where the ECU 16 controls to activate exhaust brake by reducing the degree of opening of the exhaust throttle valve 12.

On the other hand, if the question in step S402 is answered in the affirmative, the process of the ECU 16 proceeds to step S403, where the ECU 16 reads in the inflowing exhaust gas quantity Fex, the remaining PM amount ΣPM and the filter temperature Tempf.

In step S404, a prediction is made by the ECU 16 as to whether or not there is a possibility that the temperature of the particulate filter 11 will rise excessively if exhaust brake is activated by reducing the degree of opening of the exhaust throttle valve 12, based on the inflowing exhaust gas quantity Fex, the remaining PM amount ΣPM and the filter temperature Tempf that have been read in step S403.

If it is predicted in step S404 that there is no possibility that the temperature of the particulate filter 11 will rise excessively, the process of the ECU 16 proceeds to step S406. In step S406, the ECU 16 reduced the degree of opening of the exhaust throttle valve 12 to activate exhaust brake.

On the other hand, if it is predicted in step S404 that there is a possibility that the temperature of the particulate filter 11 will rise excessively, the process of the ECU 16 proceeds to step S405.

In step S405, the ECU 16 controls to reduce the degree of opening of the flow rate regulation valve 18. In this case, since the exhaust gas pressure in the upstream of the flow rate regulation valve 18 increases, and the exhaust gas pressure in the downstream of the flow rate regulation valve 18 decreases, it is possible to activate exhaust brake while reducing the in-filter pressure Pf. This means that, it is possible to activate exhaust brake while preventing excessive temperature rise of the particulate filter 11.

As per the above, the exhaust brake means in the present invention is realized by the ECU 16 which executes the exhaust brake control routine. Accordingly, it is possible to activate exhaust brake while preventing excessive temperature rise of the particulate filter 11 even while the high pressure PM filter regeneration process is being performed.

In the above described first and the second embodiments, cases in which the in-filter pressure is reduced while the high pressure PM filter regeneration process is performed by increasing the degree of opening of the exhaust throttle valve 12 have been described. However the way of reducing the in-filter pressure is not only that.

Alternatively, for example, the in-filter pressure may be reduced by decreasing the degree of opening of the intake throttle valve 8. In this case, the quantity of the exhaust gas flowing into the particulate filter 11 decreases with a decrease in the quantity of the intake air, and hence the in-filter pressure decreases.

In the case of an internal combustion engine equipped with an EGR passage for recirculating the exhaust gas from the exhaust passage upstream of the particulate filter to the intake passage and an EGR valve for regulating the gas flow through the EGR passage, the in-filter pressure may be reduced by increasing the degree of opening of the EGR valve. In this case, the quantity of the exhaust gas flowing into the particulate filter decreases with an increase in the quantity of the EGR gas, and hence the in-filter pressure decreases.

In the case of an internal combustion engine equipped with a bypass passage for guiding the exhaust gas from the exhaust passage upstream of the particulate filter to the exhaust passage downstream of the exhaust throttle valve and a flow rate regulation valve for regulating the gas flow through the bypass passage, the in-filter pressure may be reduced by increasing the degree of opening of the flow rate regulation valve. In this case, the quantity of the exhaust gas flowing into the particulate filter decreases with an increase in the flow rate of the exhaust gas that flows detouring around the particulate filter and the exhaust throttle valve, and hence the in-filter pressure decreases.

In the case of an internal combustion engine equipped with a variable volume type centrifugal supercharger, the in-filter pressure may be reduced by increasing the volume of the centrifugal supercharger. In this case, the intake air quantity decreases with a decrease in the supercharging pressure, and hence the quantity of the exhaust gas flowing into the particulate filter decreases. As a result, the in-filter pressure decreases.

While the invention has been described in terms of preferred embodiments, those skilled in the art will recognize that the invention can be practiced with modifications within the spirit and scope of the appended claims.

INDUSTRIAL APPLICABILITY

According to the present invention, it is possible to perform the high pressure PM filter regeneration process while suppressing excessive temperature rise of the particulate filter even while running conditions of the internal combustion engine can easily change as is the case when the vehicle is moving.

The invention claimed is:

1. An exhaust gas purification system for an internal combustion engine comprising:
    a particulate filter for trapping particulate matter contained in exhaust gas;
    an exhaust throttle valve provided in an exhaust passage downstream of said particulate filter;
    a PM filter regeneration device that performs a PM filter regeneration process for oxidizing and removing particulate matter trapped on said particulate filter;
    a pressure increasing device for increasing the pressure inside the particulate filter by decreasing the degree of opening of said exhaust throttle valve when said PM filter regeneration process is performed;
    a prediction device for making a prediction as to whether or not there is a possibility that the temperature of said particulate filter reaches an upper limit value, when the pressure inside said particulate filter has been increased by said pressure increasing device;
    a determining device that, when the pressure inside said particulate filter is increased by said pressure increasing device, determines that the possibility that the temperature of said particulate filter rises excessively becomes high when an inflowing exhaust gas quantity is excessively small, when the temperature of said particulate filter is close to the upper limit value, when a remaining PM amount is excessively large, or when an engine load is excessively high; and
    a pressure decreasing device that, when it is determined by said determining device that the possibility of an excessive temperature rise of said particulate filter is high, stops said PM filter regeneration process by immediately adjusting the degree of opening of said exhaust throttle valve back to a normal degree of opening and that, when it is determined by said determining device that the possibility of an excessive temperature rise of said particulate filter is not high, continues said PM filter regeneration process by decreasing the pressure inside said particulate filter when it is predicted by said prediction device that there is a possibility that the temperature of said particulate filter reaches the upper limit value.

2. An exhaust gas purification system for an internal combustion engine according to claim 1, wherein the smaller the quantity of the exhaust gas flowing into said particulate filter is, the lower the pressure inside said particulate filter is made by said pressure decreasing device.

3. An exhaust gas purification system for an internal combustion engine according to claim 1, wherein the higher the temperature of the particulate filter is, the lower the pressure inside said particulate filter is made by said pressure decreasing device.

4. An exhaust gas purification system for an internal combustion engine according to claim 1, wherein the larger the amount of particulate matter trapped on said particulate filter is, the lower the pressure inside said particulate filter is made by said pressure decreasing device.

5. An exhaust gas purification system for an internal combustion engine according to claim 1, wherein the higher the load of said internal combustion engine is, the lower the pressure inside said particulate filter is made by said pressure decreasing device.

6. An exhaust gas purification system for an internal combustion engine according to claim 1 further comprising a fuel injection device that is adapted to continue, when a running condition of said internal combustion engine enters a region in which fuel cut is to be effected while the degree of opening of said exhaust throttle valve has been decreased by said pressure increasing device, a predetermined quantity of fuel injection, wherein the higher the pressure inside said particulate filter is, the larger said predetermined quantity is made.

7. An exhaust gas purification system for an internal combustion engine according to claim 1, wherein said pressure decreasing device decreases the pressure inside said particulate filter by increasing the degree of opening of said exhaust throttle valve.

8. An exhaust gas purification system for an internal combustion engine according to claim 1 further comprising:
   a flow rate regulation valve provided in an exhaust passage upstream of said particulate filter; and
   an exhaust brake device for activating exhaust brake by decreasing the degree of opening of said exhaust throttle valve or said flow rate regulation valve,
   wherein upon activating exhaust brake while the PM filter regeneration process is performed, said exhaust brake device decreases the degree of opening of said flow rate regulation valve if it is predicted by said prediction device that there is a possibility that the temperature of said particulate filter reached said upper limit temperature, and decreases the degree of opening of said exhaust throttle valve if it is predicted by said prediction device that there is no possibility that the temperature of said particulate filter reaches said upper limit temperature.

9. An exhaust gas purification system for an internal combustion engine according to claim 1 further comprising an estimation device for estimating the amount of particulate matter remaining on said particulate filter while the PM filter regeneration process is performed, wherein the smaller the amount of particulate matter estimated by said estimation device becomes, the higher the pressure inside said particulate filter is made by said pressure decreasing device.

10. An exhaust gas purification system for an internal combustion engine according to claim 9, wherein said estimation device estimates the amount of particulate matter remaining on said particulate filter using, as parameters, the temperature of said particulate filter, the quantity of exhaust gas flowing into said particulate filter and the pressure inside said particulate filter.

* * * * *

UNITED STATES PATENT AND TRADEMARK OFFICE
CERTIFICATE OF CORRECTION

| | |
|---|---|
| PATENT NO. | : 7,877,985 B2 |
| APPLICATION NO. | : 11/794658 |
| DATED | : February 1, 2011 |
| INVENTOR(S) | : Takeshi Hashizume |

It is certified that error appears in the above-identified patent and that said Letters Patent is hereby corrected as shown below:

On the Title Page: Change PCT No. from "PCT/JP2006/009979" to --PCT/JP2006/309979--.

| Column | Line | |
|---|---|---|
| 14 | 49 | Change "($\alpha\Sigma PM = \alpha\Sigma PMb \times \alpha$)" to --($\Delta\Sigma PM = \Delta\Sigma PMb \times \alpha$)--. |

Signed and Sealed this
Twenty-eighth Day of June, 2011

David J. Kappos
*Director of the United States Patent and Trademark Office*